(12) United States Patent
Goelzer

(10) Patent No.: US 9,372,861 B2
(45) Date of Patent: Jun. 21, 2016

(54) IDENTIFYING UNSTRUCTURED ELEMENTS OF A COLLABORATIVE PLACE IN A HIERARCHICALLY STRUCTURED MANNER

(75) Inventor: Andreas P. Goelzer, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 11/769,524

(22) Filed: Jun. 27, 2007

(65) Prior Publication Data
US 2009/0006426 A1    Jan. 1, 2009

(51) Int. Cl.
*G06F 7/00* (2006.01)
*G06F 17/30* (2006.01)
*G06F 13/14* (2006.01)

(52) U.S. Cl.
CPC .................... *G06F 17/30091* (2013.01)

(58) Field of Classification Search
CPC ............... G06F 17/30327; G06F 17/30607; G06F 11/1469; G06F 17/3071; G06F 17/30091; G06F 17/30011; G06F 17/30067; G06F 17/30115; G06F 17/30017; G06F 17/30221; G06F 17/30598; G06F 17/30749; G06F 17/30943; G06F 17/30194; G06F 17/30233; G06F 17/3061; G06F 17/272
USPC ......... 707/100–104.1, 203, 10, E17.117, 651, 707/652, E17.01, 755, E17.058, 999.1, 707/999.104; 709/229, 217, 218, 203

IPC .................... G06F 17/30011,17/3061
See application file for complete search history.

(56) References Cited

U.S. PATENT DOCUMENTS

| | | | |
|---|---|---|---|
| 6,266,682 B1* | 7/2001 | LaMarca ........... | G06F 17/30011 707/999.005 |
| 7,013,340 B1* | 3/2006 | Burd ................ | G06F 17/30893 707/E17.117 |
| 7,536,413 B1* | 5/2009 | Mohan .............. | G06F 17/3071 |
| 7,620,620 B1* | 11/2009 | Sedlar .............. | G06F 17/30233 |
| 8,516,036 B2* | 8/2013 | Park ................. | G06F 17/30017 707/621 |
| 2007/0214164 A1* | 9/2007 | MacLennan ...... | G06F 17/30943 |

* cited by examiner

*Primary Examiner* — Usmaan Saeed
*Assistant Examiner* — Cecile Vo
(74) *Attorney, Agent, or Firm* — Steven M. Greenberg, Esq.; CRGO Law

(57) ABSTRACT

Embodiments of the present invention address deficiencies of the art in respect to element identification for elements in a collaborative computing environment and provide a method, system and computer program product for identifying unstructured elements of a collaborative place in a hierarchically structured manner. In one embodiment of the invention, a method for locating an unstructured element in a collaborative computing environment can be provided. The method can include receiving a request for an unstructured element in the collaborative environment, extracting a hierarchy of unique identifiers from the request, locating a last folder referenced by the hierarchy of unique identifiers, and returning a reference to the folder as a location of the unstructured element.

16 Claims, 2 Drawing Sheets

IDENTIFYING UNSTRUCTURED ELEMENTS OF A COLLABORATIVE PLACE IN A HIERARCHICALLY STRUCTURED MANNER

BACKGROUND OF THE INVENTION

1. Field of the Invention

The present invention relates to the field of collaborative computing and more particularly to element identification in a collaborative computing environment.

2. Description of the Related Art

In a collaborative computing environment, elements including documents, roles, folders and attachments can be identified by name and stored by name or by a hierarchy of names in a central server. Identifying a collaborative computing element by name or a hierarchy of names can require a structured, unique method of storing and retrieving data, for example a file system or content repository. As such, in a collaborative computing environment, oftentimes the element identification structure can be presented to end users in the form of named folders, named documents and named files.

The identification of an element in a collaborative computing environment according to a name or hierarchy of names can result in several known problems. In particular, problems can arise in identifying an element according to name or a hierarchy of names when supporting computing systems that lack a central data store and where the data is distributed among multiple systems, or where the data is replicated across host platforms, or where a computing system provides collaborative services without connection to a central server. Additionally, in a collaborative computing environment utilizing names and hierarchy of names to identify elements, the alphanumeric characters for names to be used in naming elements can be limited in the circumstance that the data store for the collaborative computing environment is a file system. In particular, many symbolic characters are not permitted in naming files for most file systems.

In order to support the identification of elements using names and hierarchies of names, collaborative environments have limited element storage to a centralized data store. However, the use of a centralized data store can be limiting, particularly in respect to offline computing and performance when multiple clients access the centralized data store. Other systems provide for distributed collaborative environments, including offline, disconnected environments with the condition to allow "read" requests on all the data stores for the distributed systems, but to limit write operations to a single host system. Accordingly, slow performance can result on "write" requests because the single host can be geographically located in a different continent of the globe. Furthermore, the single host can be susceptible to failure in which case no write permissions can be allowed.

In the former circumstance, write requests can be marshaled in distributed platforms and applied at a later time to the centralized data store, yet at some point the prolonged failure of the single host can defeat the marshaled write operations. In the latter circumstance, write operations can be applied at each remote server in cluster a distributed manner and replicated at a later time to harmonize the different data stores in the cluster. Still, the replication process can give rise to replication conflicts where two elements with the same name or record number are created, modified or deleted. Furthermore, merging data amongst data stores in a cluster can be complicated by modifying same names for different elements from different hosts in the cluster during replication so as to result in one element being overwrite by another. This limits the user experience due to suddenly changed names or incorrect merging which requires manual administrative intervention to restore the intended data.

BRIEF SUMMARY OF THE INVENTION

Embodiments of the present invention address deficiencies of the art in respect to element identification for elements in a collaborative computing environment and provide a novel and non-obvious method, system and computer program product for identifying unstructured elements of a collaborative place in a hierarchically structured manner. As used herein, a collaborative place can include a collaborative workspace, for instance a Wiki, blog, or document library. In one embodiment of the invention, a method for locating an unstructured element in a collaborative computing environment can be provided. The method can include receiving a request for an unstructured element in the collaborative environment, extracting a hierarchy of unique identifiers from the request, locating a last folder or other hierarchical structure referenced by the hierarchy of unique identifiers, and returning a reference to the folder or other hierarchical structure as a location of the unstructured element.

In one aspect of the embodiment, extracting a hierarchy of unique identifiers from the request can include extracting a hierarchy of unique identifiers from the request, each of the unique identifiers comprising an attribute type for an attribute of the unstructured element and a name for the attribute. For example, the attribute type for an attribute of the unstructured element can include an attribute type selected from the group consisting of a collaborative place, room, folder, document and attachment. Other attribute types can include comments, versions and the like. In another aspect of the embodiment, returning a reference to the folder or other hierarchical structure as a location of the unstructured element can include additionally extracting a name hierarchy for the unstructured element, resolving a folder as a child of the folder referenced by the hierarchy of unique identifiers based upon the name hierarchy, and returning a reference to the resolved folder as a location of the unstructured element.

In another embodiment of the invention, a collaborative computing data processing system can be configured for locating an unstructured element such as a memo, calendar item, document, and task. The system can include at least one collaborative server communicatively coupled to multiple different collaborative clients. The system also can include element naming logic coupled to each of the collaborative clients. The element naming logic can include program code enabled to receive a request for an unstructured element in the collaborative environment, extract a hierarchy of unique identifiers from the request, locate a last folder referenced by the hierarchy of unique identifiers, and return a reference to the folder as a location of the unstructured element. For example, each of the unique identifiers can include an attribute type for an attribute of the unstructured element and a name for the attribute. For instance, the attribute type can include by way of example a collaborative place, room, folder, document and attachment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for hierarchically identifying unstructured elements in a collaborative environment. In accordance with an embodiment of the present invention, an unstructured collaborative element such as a memo, calendar item, document, task and the like can be identified according to a hierarchy of unique identifiers. Each unique identifier can be defined by a combination of an attribute type and attribute name, the attribute type including by way of example, a collaborative place, room, folder, document or attachment. Optionally, the hierarchy of unique identifiers for an element can be combined with a named identification of the element in order to support a hierarchical representation of the element in a collaborative environment where different collaborative platforms represent the element differently according to different data structures.

Figure 1:
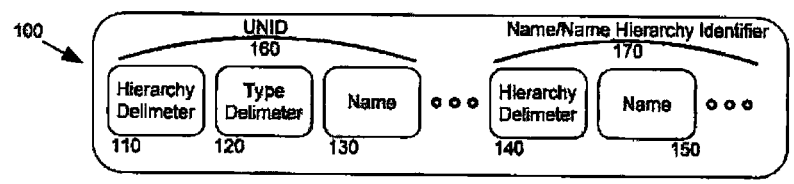
FIG. 1 is a block diagram illustrating a syntax for hierarchically identifying unstructured elements in a collaborative environment.

In illustration, FIG. 1 depicts a syntax for hierarchically identifying unstructured elements in a collaborative environment. The syntax 100 can include one or more unique identifiers 160. Each of the unique identifiers 160 can include a hierarchical delimiter 110 followed by a type delimiter 120 followed by a name 130. For example, the type delimiter 120 can indicate a collaborative place, a collaborative room within a place, a collaborative folder within a room, a document within a folder, or an attachment to a document so that the syntax, "@Pmyplace/@Rmyroom/@Fmyfolder/@D1234" is a unique identifier indicating a document having the system generated string identifier "1234" stored within the folder myfolder in the room myroom in the place myplace.

Optionally, the syntax 100 further can include a name identifier 170 combined with one or more of the unique identifiers 160. Each of the name identifiers 170 can include a hierarchical name reference to a document in a folder within a file system location. For example, the hierarchical name reference "Folder/Subfolder/Document.doc" can refer to the document entitled Document.doc stored within the subfolder of the folder Folder. Combining both the unique identifiers 160 and the name identifiers 170, a syntax for an element within a collaborative environment can include @Pmyplace/@Rmyroom/myfolder/1234.doc in which case the unique identifier can resolve to the collaborative place myplace and the room myroom within the place irrespective of how the room and place are represented within the file system. Thereafter, the file system can be consulted to determine whether or not the folder myfolder is unique for the room and whether to create or merely locate the folder myfolder in the file system before resolving the document 1234.doc.

Figure 2:
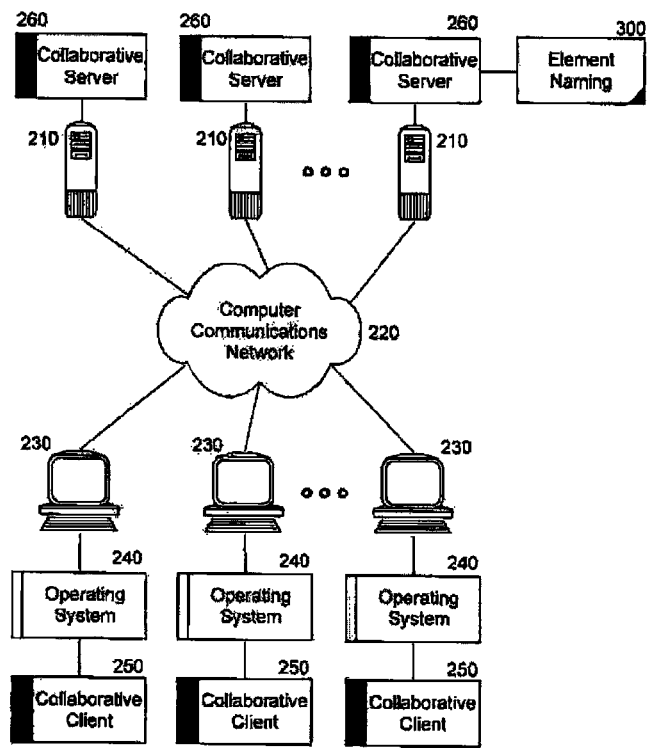
FIG. 2 is a schematic illustration of a collaborative data processing system configured for hierarchically identifying unstructured elements; and, FIG. 3 is a flow chart illustrating a process for hierarchically identifying unstructured elements in a collaborative environment.

Notably, the syntax 100 can be applied in a collaborative data processing system in the management of unstructured elements, such as memos, documents, calendar appointments meetings, tasks and the like. In illustration, FIG. 2 schematically depicts a collaborative data processing system configured for hierarchically identifying unstructured elements. The system can include one or more host computing platforms 210 configured for communicatively coupling to one or more client computing platforms 230 over computer communications network 220. Each of the host computing platforms 210 can support the operation of a collaborative server 260, for instance, a Domino™ or Workplace™ brand collaborative server manufactured by International Business Machines Corporation of Armonk, N.Y.

Each of the client computing platforms 230, by comparison, can include an operating system 240 hosting a respective operating system 240. Each operating system 240, in turn, can support the operation of a collaborative client 250 such as the Lotus™ Notes™ collaborative client manufactured by International Business Machine Corporation of Armonk, N.Y. In particular, each collaborative client 250 can be configured to communicate with a corresponding one of the collaborative servers 260 over computer communications network 220. Finally, element naming logic 300 can be coupled to one or more of the collaborative servers 260.

The element naming logic 300 can include program code enabled to locate an unstructured element in the collaborative servers 260 according to a hierarchy of unique identifiers optionally combined with a naming hierarchy for the element. In this regard, one or more attribute types for attributes of the element can be specified in hierarchical order irrespective of an underlying file system data structure storing the element. For example, a hierarchy of place, room, folder, document and attribute can be specified wholly or partially in order to uniquely identify the element without regard to the underlying file system structure storing the element. Further, a naming hierarchy reflective of the file system data structure storing the element can be combined with the hierarchy of unique identifiers for the element such as folder-subfolder-file.

Figure 3:
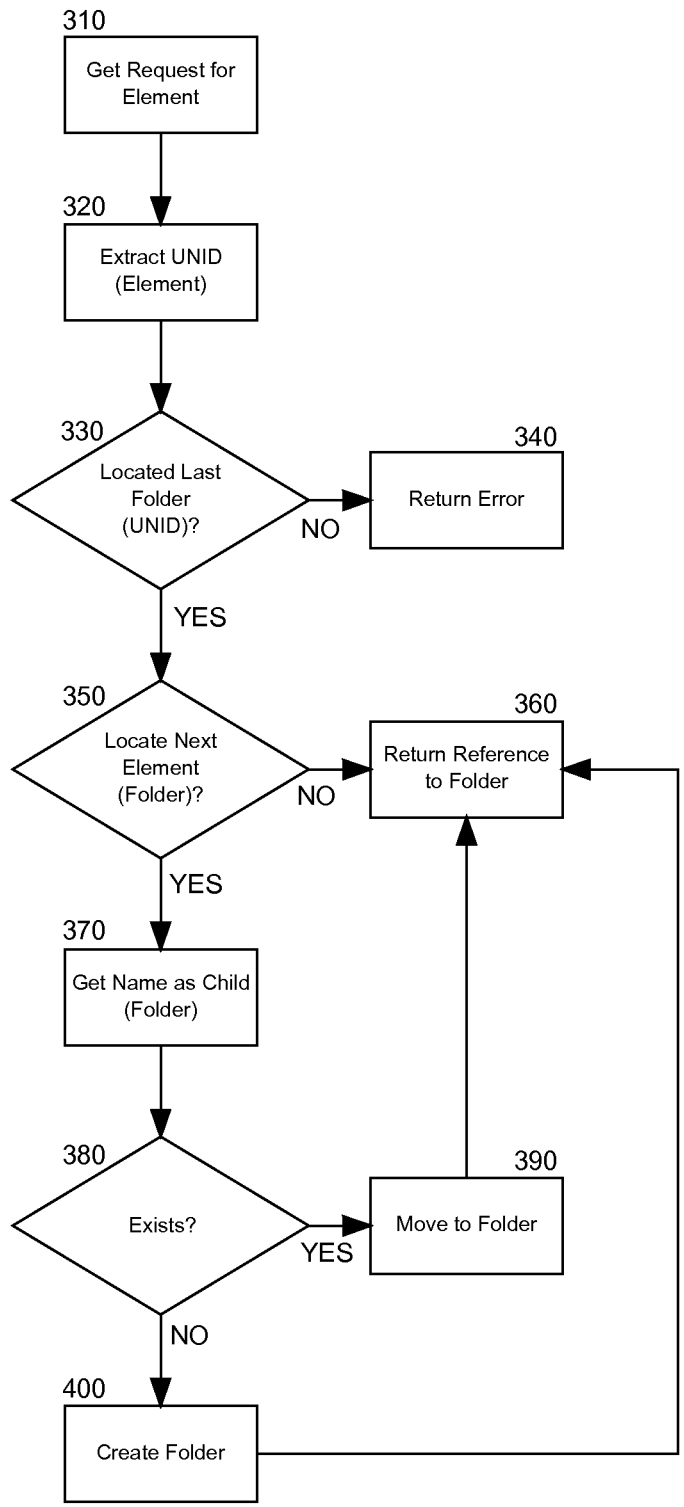

In further illustration of the operation of the element naming logic 300, FIG. 3 is a flow chart illustrating a process for hierarchically identifying unstructured elements in a collaborative environment. The process can begin in block 310 with a request to locate an unstructured element in the collaborative environment. In block 320, a unique identifier or combination of unique identifiers arranged in hierarchical form can be extracted for the element in order to locate the element. In decision block 330, a last folder or other hierarchical structure specified by the hierarchy of unique identifiers can be determined. If none can be located, in block 340 an error can be returned. Otherwise, the process can continue through block 350.

In decision block 330, if a last folder or other hierarchical structure can be located for the hierarchy of unique identifiers, in decision block 350 it can be determined whether a named hierarchy for the element has been combined with the hierarchy of unique identifiers. If not, a reference to the last folder or other hierarchical structure can be returned as the location of the element in block 360. However, if a named hierarchy has been provided, in block 370 the folder-subfolder-file hierarchy specified by the named hierarchy can be located relative to the last folder or other hierarchical structure.

In decision block 380, if the folder-subfolder-file hierarchy exists in the collaborative environment, in block 390, the folder resolving for the folder-subfolder-file hierarchy can be resolved relative to the last folder or other hierarchical structure referenced by the hierarchy of unique identifiers. Otherwise, in block 400, a folder-subfolder-file hierarchy and resulting folder can be created relative to the last folder or other hierarchical structure referenced by the folder-subfolder-file hierarchy. In either case, in block 360 the final reference to the folder or other hierarchical structure can be returned as the location of the element for processing in the collaborative environment.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for locating an unstructured element in a collaborative computing environment comprises:
   receiving in element naming logic executing in memory by a processor of a host server, a request for an unstructured element stored amongst multiple different host computing platforms, each supporting the operation of at least one corresponding collaborative server in the collaborative environment at least two of the different host computing platforms comprising differing file systems from one another the differing file systems providing different file system data structures for storing an element;
   extracting a hierarchy of unique identifiers from the request, the unique identifiers directly referring to organizational elements of a hierarchy of storage locations in the collaborative computing environment, the organizational elements being unrelated to a file system and not being represented by a file system the storage locations in the collaborative computing environment being independent from and not defined by an underlying file system of any of the multiple different host computing platforms;
   locating a last file folder in a file system of one of the different host computing platforms that is referenced by the hierarchy of unique identifiers the last file folder containing one or more files; and,
   returning a reference to the folder in the file system of the one of the different host computing platforms computer as a location of the unstructured element that stores therein the unstructured element.

2. The method of claim 1, wherein receiving a request for an unstructured element in the collaborative environment, comprises receiving a request for a collaborative document selected from the group consisting of a memo, calendar item, document, and task.

3. The method of claim 1, wherein extracting a hierarchy of unique identifiers from the request, comprises extracting a hierarchy of unique identifiers from the request, each of the unique identifiers comprising an attribute type for an attribute of the unstructured element and a name for the attribute.

4. The method of claim 3, wherein the attribute type for an attribute of the unstructured element comprises an attribute type selected from the group consisting of a collaborative place, room, folder, document, attachment, comment and version.

5. The method of claim 1, wherein returning a reference to the folder as a location of the unstructured element comprises:
   additionally extracting a name hierarchy for the unstructured element;
   resolving a folder as a child of the folder referenced by the hierarchy of unique identifiers based upon the name hierarchy; and,
   returning a reference to the resolved folder as a location of the unstructured element.

6. The method of claim 5, wherein resolving a folder as a child of the folder referenced by the hierarchy of unique identifiers based upon the name hierarchy, comprises:
   locating an existing folder as a child of the folder referenced by the hierarchy of unique identifiers based upon the name hierarchy; and,
   otherwise creating a folder as a child of the folder referenced by the hierarchy of unique identifiers based upon the name hierarchy if the created folder had not previously existed.

7. A collaborative computing data processing system configured for locating an unstructured element, the system comprising:
   one or more respectively different host computing platforms, each host computing platform comprising memory and at least one processor and communicatively coupled to a plurality of collaborative clients at least two of the different host computing platforms comprising differing file systems from one another, the differing file systems providing different file system data structures for storing an element;

a multiplicity of collaborative servers of a collaborative computing environment, each of the collaborative servers executing in the one or more respectively different host computing platforms; and, element naming logic coupled to each of the collaborative clients, the element naming logic comprising program code enabled to receive a request for an unstructured element stored in connection with one of the host computing platforms, extract a hierarchy of unique identifiers from the request, the unique identifiers directly referring to organizational elements of a hierarchy of storage locations in the collaborative computing environment, the unique identifiers being unrelated to a file system and the organizational elements not being represented by a file system the storage locations of in the collaborative computing environment being independent from and not defined by an underlying file system of corresponding ones of the multiple different host computing platforms, locate a last file folder in a file system of one of the different host computing platforms that is referenced by the hierarchy of unique identifiers the last file folder containing one or more files, and return a reference to the folder in the one of the different host computing platforms as a location of the unstructured element that stores therein the unstructured element.

8. The system of claim 7, wherein the collaborative element is a collaborative document selected from the group consisting of a memo, calendar item, document, and task.

9. The system of claim 7, wherein each of the unique identifiers comprises an attribute type for an attribute of the unstructured element and a name for the attribute.

10. The system of claim 9, wherein the attribute type for an attribute of the unstructured element comprises an attribute type selected from the group consisting of a collaborative place, room, folder, document and attachment.

11. A computer program product comprising a non-transitory computer usable memory device storing computer usable program code for locating an unstructured element in a collaborative computing environment, the computer program product comprising:

computer usable program code for receiving a request for an unstructured element stored amongst multiple different host computing platforms, each supporting the operation of at least one corresponding collaborative server in the collaborative environment at least two of the different host computing platforms comprising differing file systems from one another the differing file systems providing different file system data structures for storing an element;

computer usable program code for extracting a hierarchy of unique identifiers from the request, the unique identifiers directly referring to organizational elements of a hierarchy of storage locations in the collaborative computing environment, the organizational elements being unrelated to a file system and not being represented by a file system the storage locations in the collaborative computing environment being independent from and not defined by an underlying file system of any of the multiple different host computing platforms;

computer usable program code for a last file folder in a file system of one of the different host computing platforms that is referenced by the hierarchy of unique identifiers the last file folder containing one or more files; and, computer usable program code for returning a reference to the folder in the file system of the one of the different host computing platforms as a location of the unstructured element that stores therein the unstructured element.

12. The computer program product of claim 11, wherein the computer usable program code for receiving a request for an unstructured element in the collaborative environment, comprises computer usable program code for receiving a request for a collaborative document selected from the group consisting of a memo, calendar item, document, and task.

13. The computer program product of claim 11, wherein the computer usable program code for extracting a hierarchy of unique identifiers from the request, comprises computer usable program code for extracting a hierarchy of unique identifiers from the request, each of the unique identifiers comprising an attribute type for an attribute of the unstructured element and a name for the attribute.

14. The computer program product of claim 13, wherein the attribute type for an attribute of the unstructured element comprises an attribute type selected from the group consisting of a collaborative place, room, folder, document, attachment, comment and version.

15. The computer program product of claim 11, wherein the computer usable program code for returning a reference to the folder as a location of the unstructured element comprises:

computer usable program code for additionally extracting a name hierarchy for the unstructured element;

computer usable program code for resolving a folder as a child of the folder referenced by the hierarchy of unique identifiers based upon the name hierarchy; and, computer usable program code for returning a reference to the resolved folder as a location of the unstructured element.

16. The computer program product of claim 15, wherein the computer usable program code for resolving a folder as a child of the folder referenced by the hierarchy of unique identifiers based upon the name hierarchy, comprises:

computer usable program code for locating an existing folder as a child of the folder referenced by the hierarchy of unique identifiers based upon the name hierarchy; and, computer usable program code for otherwise creating a folder as a child of the folder referenced by the hierarchy of unique identifiers based upon the name hierarchy if the created folder had not previously existed.

* * * * *